(12) United States Patent
Montero et al.

(10) Patent No.: US 10,429,988 B2
(45) Date of Patent: Oct. 1, 2019

(54) TOUCH SCREEN SUPPORT BY EMULATING A LEGACY DEVICE

(71) Applicant: Dell Products L.P., Round Rock, TX (US)

(72) Inventors: Adolfo S. Montero, Pflugerville, TX (US); No Hua Chuang, Taipei (TW)

(73) Assignee: Dell Products L.P., Round Rock, TX (US)

(*) Notice: Subject to any disclaimer, the term of this patent is extended or adjusted under 35 U.S.C. 154(b) by 197 days.

(21) Appl. No.: 15/474,432

(22) Filed: Mar. 30, 2017

(65) Prior Publication Data

US 2018/0284938 A1 Oct. 4, 2018

(51) Int. Cl.
*G06F 3/041* (2006.01)
*G06F 1/3215* (2019.01)
*G06F 1/3234* (2019.01)
*G06F 3/0488* (2013.01)

(52) U.S. Cl.
CPC .......... *G06F 3/0416* (2013.01); *G06F 1/3215* (2013.01); *G06F 1/3262* (2013.01); *G06F 3/04883* (2013.01); *G06F 3/04886* (2013.01)

(58) Field of Classification Search
CPC ... G06F 3/038; G06F 3/03547; G06F 3/03543
See application file for complete search history.

(56) References Cited

U.S. PATENT DOCUMENTS

| | | | | |
|---|---|---|---|---|
| 7,383,457 B1* | 6/2008 | Knight | ...................... | G06F 1/32 713/320 |
| 2004/0107268 A1* | 6/2004 | Iriya | ................... | G06F 3/04817 709/219 |
| 2006/0197675 A1* | 9/2006 | Liu | ...................... | H04B 10/114 340/12.22 |
| 2009/0235281 A1* | 9/2009 | Lu | ........................ | G06F 3/04886 719/318 |
| 2010/0283747 A1* | 11/2010 | Kukulski | .............. | G06F 3/0488 345/173 |
| 2013/0018490 A1* | 1/2013 | Caffrey | ................... | G05B 15/02 700/83 |
| 2013/0215038 A1* | 8/2013 | Senanayake | .......... | G06F 3/0488 345/169 |
| 2014/0071172 A1* | 3/2014 | Hussain | ............... | G09G 3/3406 345/690 |
| 2014/0188470 A1* | 7/2014 | Chang | ..................... | G10L 15/14 704/236 |
| 2017/0010659 A1* | 1/2017 | Park | ......................... | G06F 1/26 |
| 2017/0031464 A1 | 2/2017 | Montero | | |

* cited by examiner

*Primary Examiner* — Benyam Ketema
(74) *Attorney, Agent, or Firm* — Norton Rose Fulbright US LLP (57) ABSTRACT

An information handling system with a touchscreen is disclosed. When the operating system has not been loaded or a driver of the touchscreen is absent, an embedded controller of the information handling system receives and presents touch input information from the touchscreen to a host processor by emulating the touchscreen as a legacy PS2 device. After the operating system is loaded and a driver for the touchscreen is running, the legacy PS2 device emulation is terminated and touch input information from the touchscreen is presented through an I/O interface to the host processor and processed by the operating system.

20 Claims, 6 Drawing Sheets

TOUCH SCREEN SUPPORT BY EMULATING A LEGACY DEVICE

FIELD OF THE DISCLOSURE

The instant disclosure relates to computer systems. More specifically, portions of this disclosure relate to computer systems that supports touch input devices, such as touchscreens, by emulating a legacy device of the computer systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can accept user input as touches made through touchscreens and pointing devices. Conventional pointing devices include a mouse, which translates movement detected at the mouse to movement of a cursor on a screen, and a touchpad, which translates movement on a touch sensitive surface into movement of a cursor on a screen. Touchscreens are another type of input device that allow users to provide touch input directly over displayed visual information. For example, tablets are built into a planar housing without a physical keyboard and have a touchscreen that acts as both a keyboard and a touchpad.

One difficulty with touch input devices such as touchscreens and touchpads is that these devices communicate using device drivers installed in an operating system. When the operating system has not been loaded (such as during boot, system setup, under factory tools, in DOS, or other pre-OS states) or the driver has not been properly installed, touch input devices do not operate.

SUMMARY

Certain embodiments of an information handling system with a touchscreen are disclosed. When the operating system has not been loaded or a driver of the touchscreen is absent, an embedded controller of the information handling system receives touch input information from the touchscreen and presents the user input to a host processor by emulating the touchscreen as a legacy PS2 device. After the operating system and a driver for the touchscreen is loaded, the legacy PS2 device emulation is terminated and touch input information from the touchscreen is processed by the operating system. The embedded controller of the information handling system thus provides temporary translation of user input to a legacy format that can be interpreted without a touchscreen driver.

The embedded controller may perform additional operations by receiving the touchscreen input. For example, if the information handling system transitions into a sleep mode after an idle period, the embedded controller transitions to a power saving mode and monitors touch activities on the touchscreen for wake-up signals. In some embodiments, the embedded controller may process user gestures included in the received touch input information.

According to one embodiment, an information handling system includes: a touchscreen configured to display information and to receive input from a user by touching a location on the touchscreen; an embedded controller coupled to the touchscreen and configured, in a first operational mode, to receive a user input from the touchscreen through a first data bus, and to provide the user input to a host processor by presenting, over a second bus, the received user input to the host processor as input from a legacy device; and an input/output (I/O) interface coupled to the touchscreen and configured, in a second operational mode, to receive a user input from the touchscreen through the first data bus, and to provide the user input to the host processor over a third bus. In some embodiments, the first bus is an I2C bus, the second bus is an LPC bus, the third bus is an internal connection between a Platform Controller Hub (PCH) and a central processing unit (CPU), and the embedded controller is configured to perform the step of presenting, over the second bus, the received input to the host processor as input from the legacy device by transmitting PS/2 signals over the LPC bus to emulate user input received at the legacy device. The I/O interface may comprise a PCH.

In some embodiments, the embedded controller is configured detect a gesture of the user in the user input received from the touchscreen and to provide a translation of the gesture to the host processor as a legacy input over the second bus. The embedded controller may also be configured to display a virtual keyboard on the touchscreen to obtain the user input and to provide the user input to the host processor over the second bus as an emulated physical keyboard. For example, during power-on self-test (POST), system booting, or system setup, the embedded controller may display a virtual keyboard on the touchscreen through a Basic Input/Output System (BIOS) or a Small Board Interface Operating System (SBIOS).

In some embodiments, the information handling system may be configured to transition into a sleep mode after an idle period, wherein the embedded controller may be configured to monitor touch activities on the touchscreen and in response wake up the information handling system. The embedded controller may be configured to transition into a power saving mode when the information handling system transitions into the sleep mode. In the power saving mode the embedded controller may monitor touch activities on the touchscreen using the legacy device. The embedded controller may block the I/O interface from monitoring touch activities on the touchscreen when the information handling system is in the sleep mode by, for example, holding a voltage on a clock line and/or a data line low to block the I/O interface from monitoring touch activities on the touchscreen when the information handling system is in the sleep mode.

In some embodiments, the embedded controller is configured to perform steps comprising: operating in the first operational mode at initialization of the information handling system; detecting, after the initialization of the information handling system, that the host processor loaded a driver for the touchscreen; and/or switching, after detecting the host processor loaded the driver for the touchscreen, to the second operational mode.

Certain embodiments of methods for processing touch input information from a touchscreen are disclosed. In one embodiment, a method may include: detecting a user touch input at the touchscreen; operating in a first operational mode at initialization of the information handling system, wherein in the first operational mode an embedded controller of the information handling system is configured to provide the user touch input to a host processor by presenting the received user touch input to the host processor as input from a legacy device; detecting, by the embedded controller and after the initialization of the information handling system, that the host processor loaded a driver for the touchscreen; and switching, after detecting the host processor loaded the driver for the touchscreen, to a second operational mode, wherein in the second operational mode the user touch input is presented to the host processor using the driver for the touchscreen.

According to another embodiment, a method may include: detecting a user touch input at the touchscreen; determining an operational mode of the information handling system; passing the user input to a host processor of the information handling system via an embedded controller in response to a determination that the information handling system is operating in a first operational mode, wherein the embedded controller is configured to provide the user input to the host processor by presenting the received user input to the host processor as an input from a legacy device; and passing the inputs to the host processor via an I/O interface in response to a determination that the information handling system is operating in a second operational mode. In some embodiment, the method may also include: operating in the first operational mode at initialization of the information handling system; detecting, after the initialization of the information handling system, that the host processor loaded a driver for the touchscreen; and switching, after detecting the host processor loaded the driver for the touchscreen, to the second operational mode.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
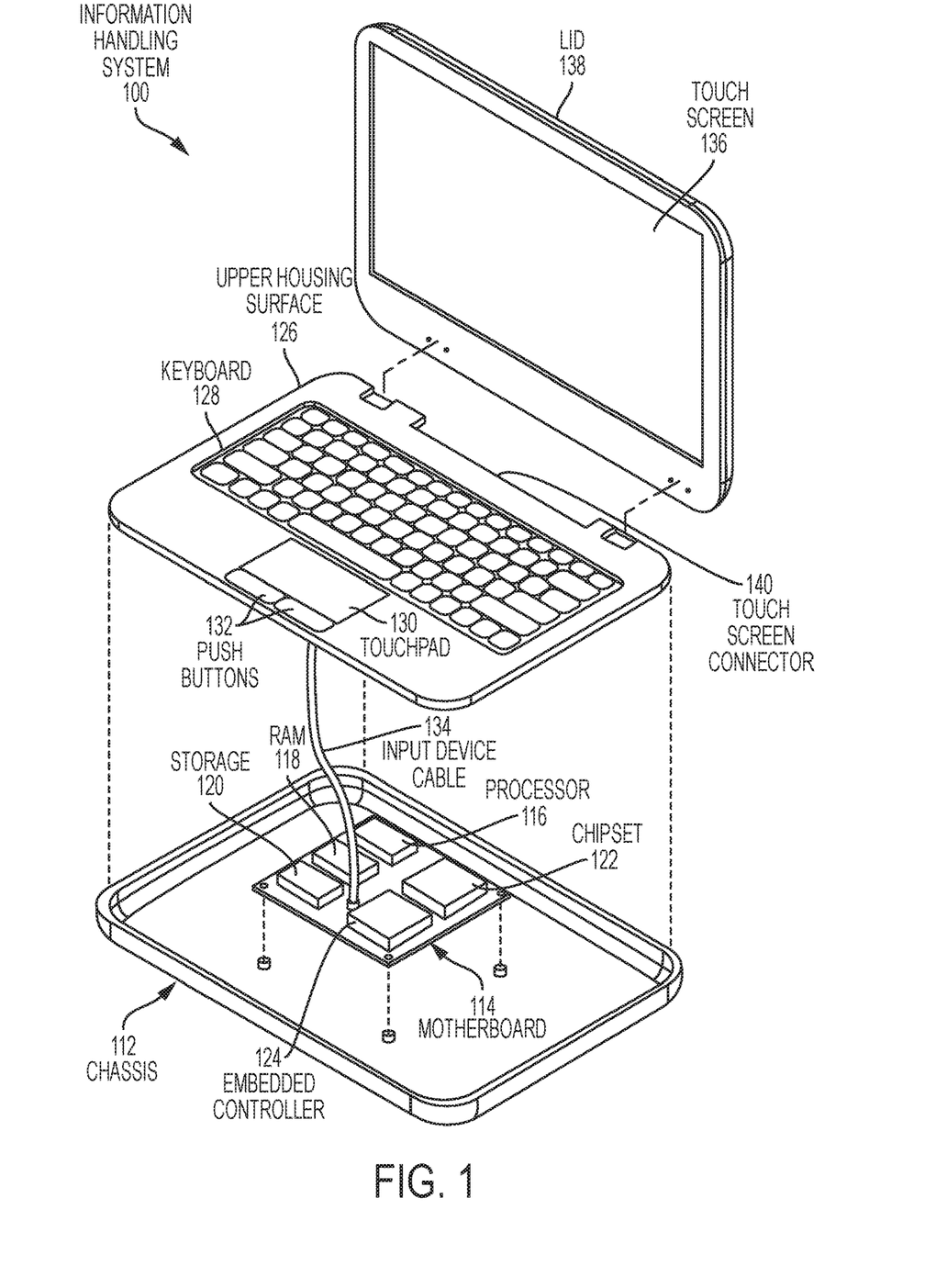
FIG. 1 illustrates one example of an information handling system with touch input devices according to some embodiments of the disclosure.

FIG. 1 illustrates one example of an information handing system 100 with touch input devices. The information handling system 100 includes a chassis 112 and an upper housing 126, which together may form a closed housing for processing components of the information handling system 100. Information handling system 100 further includes a touchscreen 136 housed in a lid 138. Touchscreen 136 and lid 138 are connected to chassis 112 and upper housing surface 126 and able to rotate to open or close display of the touchscreen 136 between lying flat on the upper housing surface 126 and resting at approximately a right angle with respect to the upper housing surface 126. In some embodiments, the connection between the chassis 112 and the upper housing surface 126 may allow the touchscreen 136 to rotate up to 360 degrees to lay flat against the chassis 112. The touchscreen 136 may interface with other electronics of the information handling system 100 through one or more touchscreen connectors 140. Although a particular laptop configuration is illustrated in FIG. 1, alternative housings may be used to contain the processing components, such as a tablet form factor, a desktop form factor, a mobile phone form factor, among other form factors currently known and future-developed form factors. Further, other types of I/O devices that accept input from a user may be used, such as a wireless touchscreen, touchpad, peripheral mouse, or keyboard, among others.

The chassis 112 may contain a motherboard 114 having processing components for processing information. Motherboard 114 may include a processor 116 (such as a CPU), a random access memory (RAM) 118, a storage device 120 (such as a hard disk drive or a solid state drive), a chipset 122, an embedded controller 124, and other components (not shown), interconnected to each other through buses (not shown) on motherboard 114. These components may be configured to perform a variety of functions. For example, processor 116 may execute instructions to process information stored in RAM 118. Chipset 122 may include a variety of processing devices that execute firmware instructions to coordinate communications, such as a Basic Input/Output System (BIOS) or a Unified Extensible Firmware Interface (UEFI). Embedded controller 124 may be part of the chipset and may execute BIOS or UEFI instructions to manage interactions with input/output (I/O) devices. For certain configurations, a Small Board Interface Operating System (SBIOS) may process the UEFI instructions and then send commands to embedded controller 124. The embedded controller 124 may be attached to the motherboard 114 and coupled through the motherboard 114 to the processor 116 and/or other system components. Although embedded controllers for information handling systems are described, other controllers may be configured with similar hardware and/or to perform similar operations described herein. During normal operation, an operating system (OS) executing on processor 116 processes input from the touchscreen 136. However, the embedded controller 124 may process inputs from the touchscreen 136 and manage system operations when the operating system is not active, such as during BIOS setup, DOS modes, factory tool control, and other pre-operating system functional states.

Other input devices may also interface with the embedded controller 124 and/or the chipset 122. For example, upper housing surface 126 may include a keyboard 128 and a touchpad 130 with one or more push buttons 132. An input device cable 134 may couple keyboard 128 and touchpad 130 to motherboard 114 and the embedded controller 124 and/or the chipset 122.

Touchscreen 136 may be configured to receive input information from a user by detecting user touches, where touches at different locations of touchscreen 136 may represent different inputs. For example, touchscreen 136 may display a virtual keyboard on the screen to allow the user to input information by tapping on the virtual keyboard. During power-on self-test (POST), system booting, or system setup, a virtual keyboard may be displayed on touchscreen 136 using embedded controller 124 under a Basic Input/Output System (BIOS) or a Small Board Interface Operating System (SBIOS). Further, when an operating system (OS) is loaded, but a driver for touchscreen 136 is missing or impaired, embedded controller 124 may remain in control of touchscreen 136 for displaying a virtual keyboard. As another example, touchscreen 136 may display one or more buttons representing different options for the user to choose from by touching one or more of the buttons. Furthermore, touchscreen 136 may also be configured to detect gestures, such as a single tap, double taps within a predetermined period of time, three taps within a predetermined period of time, sliding/swiping of one finger, sliding/swiping of two fingers in different directions, and the like, and convert those gestures to legacy input commands. For example, a double tap may be emulated as a double left button click, a short tap may be emulated as a left or right button click, a long tap may be emulated as a right or left button click, and sliding/swiping of one or more fingers may be emulated as a scroll on a scroll wheel. Touch input received from touchscreen 136 may be provided to processor 116 from the chipset 122 and/or embedded controller 124. As an output device, touchscreen 136 is also configured to present information as visual images, such as graphics from a graphics processor of chipset 122 or processor 116.

User inputs received from touchscreen 136 may be processed by a driver executing in an operating system (executing on processor 116) or translated by embedded controller 124 for processing in a legacy application. For example, when a driver for touchscreen 136 is installed and loaded within an operating system of the information handling system 100, the operating system receives and processes user inputs from touchscreen using the driver and the processing power of processor 116. When the driver for touchscreen 136 is not loaded (e.g., during BIOS setup, DOS modes, factory tool control and other pre-operating system functional states), embedded controller 124 may receive and translate user inputs from touchscreen 136 to an emulated device supported by legacy applications.

In some embodiments, embedded controller 124 may present user inputs from touchscreen 136 to processor 116 through a legacy PS2 mouse protocol. The legacy PS2 device is emulated (or virtualized) when the operating system is not present or does not have native support for processing input from touchscreen 136. The legacy PS2 mouse protocol is supported with firmware code on embedded controller 124 that sends inputs with (x, y, button) information over the 0x60/0x64 standard I/O channel, such as at a pin of a processor 116 or chipset 122 as a general purpose input/output (GPIO). The touch input information may be provided to processor 116 using the existing PS2 legacy touch input stack of embedded controller 124 when an appropriate driver is not enabled indicating that a legacy application is executing that is not capable of interpreting information arriving at the processor 116 from a general I/O interface. In some embodiments, user input from touchpad 130 may be processed in the same way as described above for user inputs from touchscreen 136.

Figure 2:
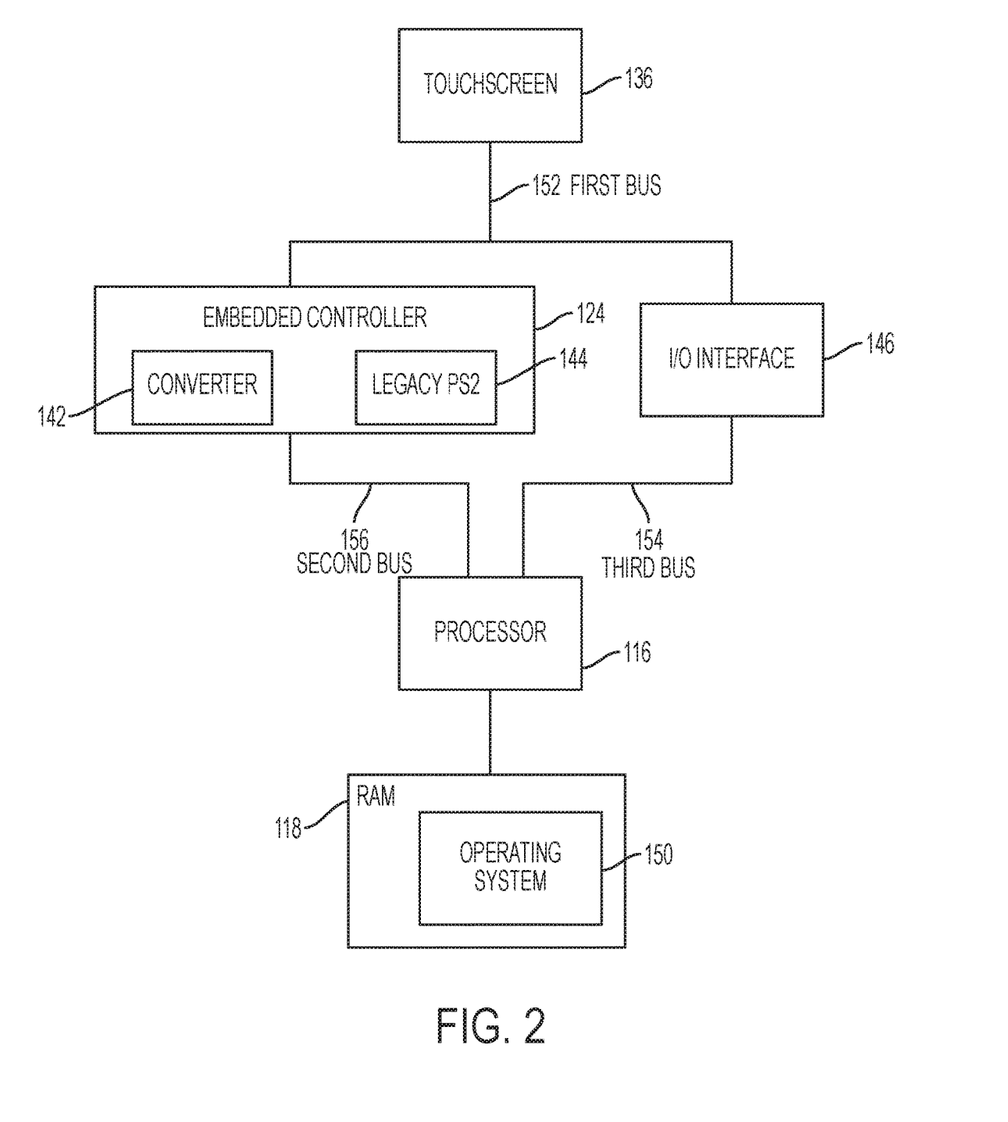
FIG. 2 illustrates a block diagram of an information handling system that supports touch input devices according to some embodiments of the disclosure.

Example data flow for user input received at the touchscreen 136 is described with reference to FIG. 2. FIG. 2 illustrates a functional block diagram of information handling system 100 for processing touch input data from touchscreen 136 according to some embodiments of the disclosure. Touchscreen 136 is coupled to embedded controller 124 and an I/O interface 146 via a first bus 152. The I/O interface 146 may be integrated with the chipset 122. Embedded controller 124 is coupled to processor 116 via a second bus 156; and I/O interface 146 is coupled to processor 116 via a third bus 154. Processor 116 is in turn coupled to RAM 118, in which operating system 150 (and its drivers for components of the information handling system 100) may be loaded. Embedded controller 124 may include a converter 142 and a legacy PS2 stack 144. In some embodiment, first bus 152 may be an I2C (Inter-Integrated Circuit) bus coupled to both embedded controller 124 and I/O interface 146. The I2C buses may provide short-distance, intra-board communication. An I2C bus consumes less power and costs less than a Universal Serial Bus (USB), which may alternatively couple the touchscreen 136 to other components. Second bus 156 may be a Low Pin Count (LPC) bus or an enhanced Serial Peripheral Interface (eSPI)

bus. In some embodiment, the I/O interface 146 may be a Platform Controller Hub (PCH) and the third bus 154 may be an internal connection between the PCH and the processor 116, where the PCH may appear to processor 116 as a Peripheral Component Interface (PCI) device. Embedded controller 124 may control I/O interface 146 through the first bus 152. For example, embedded controller 124 may enable or disable I/O interface 146, and/or power down or wake up I/O interface 146, or the like. In some embodiments, embedded controller 124 may have a dedicated signal path to couple the embedded controller 124 to the I/O interface 146.

When information handling system 100 is turned on, embedded controller 124 may determine whether a driver for touchscreen 136 is loaded. For example, embedded controller 124 may determine whether a driver for touchscreen 136 is loaded by checking a flag set by a status check performed by an Advanced Configuration and Power Interface (ACPI). If not, touch input information from touchscreen 136 is received via first bus 152 by embedded controller 124 at converter 142, which converts the touch input information into legacy PS2 formatted information and passes the touch input information to legacy PS2 stack 144. Legacy PS2 stack 144 then sends the touch input information to processor 116 via second bus 156. This virtualization or emulation process allows embedded controller 124 to present the touch input from touchscreen 136 to processor 116 as if the touch input information is from a legacy PS2 device. In some embodiments, rather than passing the touch input information directly to processor 116, embedded controller 124 itself may process the touch input information to detect user gestures in the input data and generate equivalent commands through the legacy PS2 stack 44. Such touch input information from touchscreen 136 may include taps on virtual keyboard display on the touchscreen, single finger gestures (e.g., sliding/swiping, multiple taps, etc.), multiple-finger gestures (e.g., sliding/swiping with two fingers in different directions at the same time, etc.), and the like.

If embedded controller 124 determines that a touchscreen driver is loaded, embedded controller 124 hands control to I/O interface 146 and touch input information from touchscreen 136 is received at I/O interface 146 via first bus 152 and then presented to processor 116 via third bus 154. The touch input information may then be processed by operating system 150 in a driver for touchscreen 136 executing on processor 116. The legacy PS2 device emulation at embedded controller 124 is terminated and legacy PS2 stack 144 stops sending touch input to processor 116. The PS2 emulation may be terminated by processor 116 sending a termination command to embedded controller 124, or embedded controller 124 may self-terminate the PS2 emulation after detecting a driver is available to process touch input information from touchscreen 136. When operating system 150 is loaded but no driver for touchscreen 136 is installed in the operating system to support touch input information processing, PS2 emulation may continue at embedded controller 124 so that touch input information from touchscreen 136 may be available to processor 116.

When information handling system 100 is idle for a predetermined period of time, the system 100 may transition into a sleep mode. While in sleep mode, information handling system 100 may still need to monitor touch activities on touchscreen 136 so that the system can wake up when touch input is detected on touchscreen 136. In some embodiments, it may be advantageous to monitor touch activities from touchscreen 136 through embedded controller 124 rather than I/O interface 146 because embedded controller 124 may consume less power than the I/O interface 146. For example, in the power saving mode, embedded controller 124 may perform PS2 emulation with an I2C bus as the first bus 152, which consumes less power than using the PCH I/O interface 146 and processor 116 to detect touch activities on the I2C bus.

Figure 3:
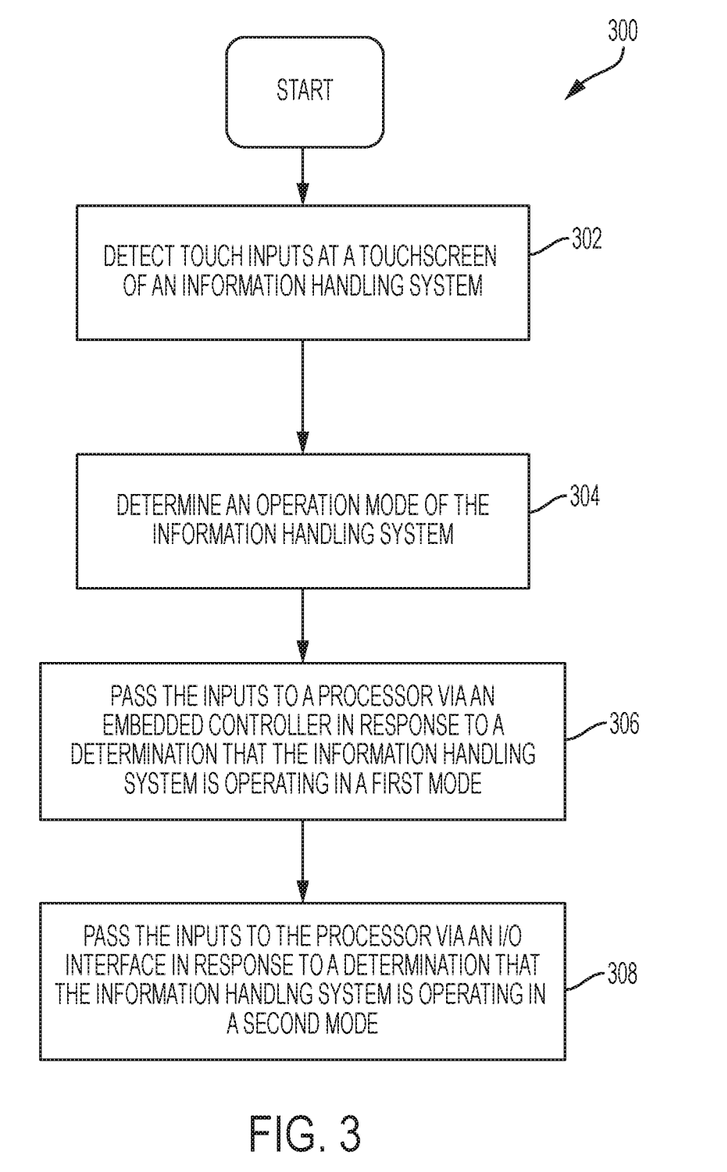
FIG. 3 illustrates one example of a method for processing inputs from a touch input device of an information handling system according to some embodiments of the disclosure.

FIG. 3 illustrates one example method 300 for processing touch input from a touchscreen of information handling system 100 according to some embodiments of the present disclosure. Method 300 includes detecting, at step 302, touch input at a touchscreen of an information handling system, such as touchscreen 136 of information handling system 100 of FIG. 1. Step 304 determines an operation mode of the information handling system. The determination at step 304 may be to identify a first operation mode in which no driver for the touchscreen is loaded and a second operation mode in which a driver for the touchscreen is loaded.

If the information handling system 100 is determined to be operating in a first operation mode, step 306 passes the touch input to a host processor of the information handling system via an embedded controller, such as embedded controller 124. If the information handling system is determined to be operating in a second operation mode, step 308 passes the touch input information to a host processor of the information handling system via an I/O interface, such as I/O interface 146 (which may be a PCH). In some embodiments, in the second operation mode, an operating system of the information handling system is loaded and a driver for the touchscreen is installed and loaded. In the first operation mode, either the operating system has not been loaded or the driver of the touchscreen is not installed, such as may occur in a pre-operating system mode (e.g., during boot, system setup, under factory tools, in DOS mode, etc.) or touchscreen driver absence or malfunction. In the first operation mode, embedded controller 124 emulates the touchscreen as a legacy PS2 device and presents the touch input to processor 116 as if the input is from the legacy PS2 device.

Figure 4:
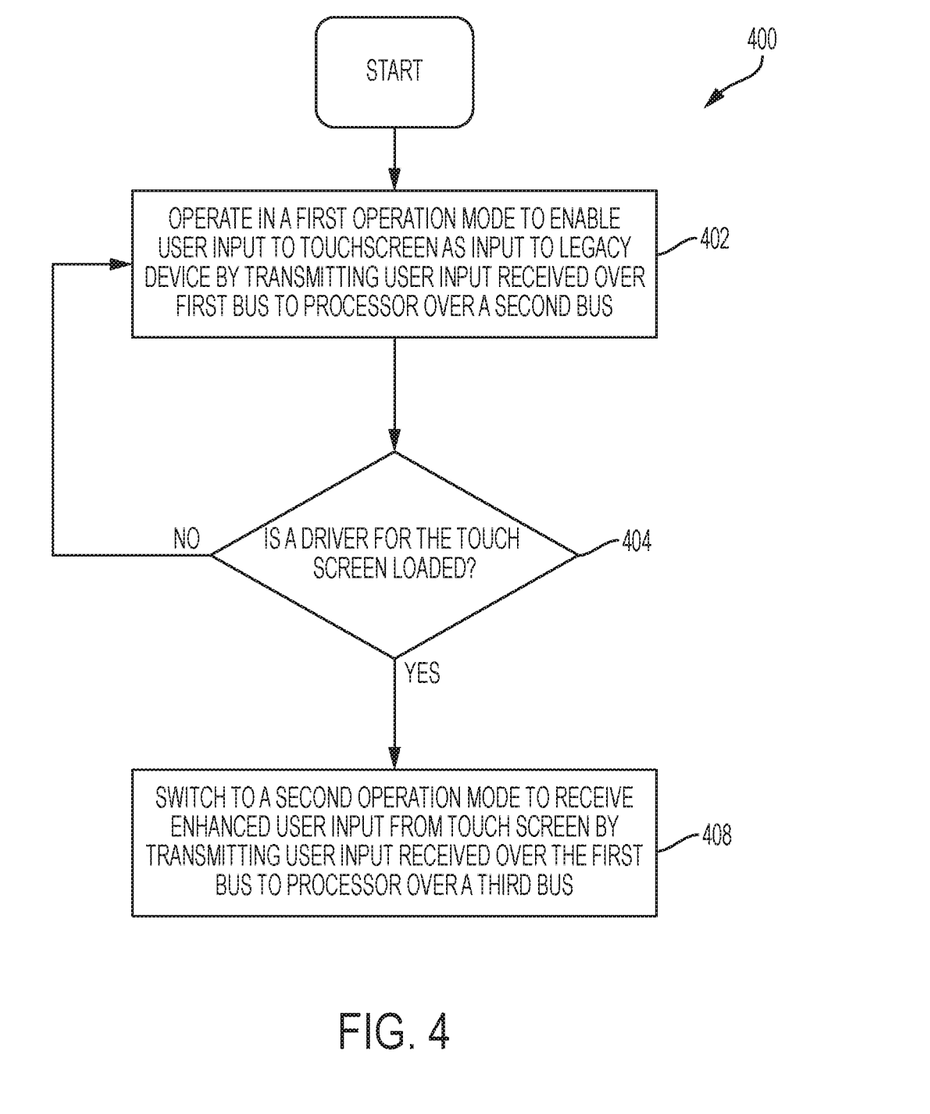
FIG. 4 illustrates one example of a method for processing inputs from a touch input device of an information handling system according to some embodiments of the disclosure.

FIG. 4 illustrates one example method 400 for processing touch input from a touchscreen of information handling system 100 according to some embodiments of the present disclosure. Beginning at step 402, the information handling system operates in a first operation mode to emulate user input to touchscreen as input to a legacy device by processing the received user input received over a first bus for transfer to a processor over a second bus. The first bus may be first bus 152 (such as an I2C bus), and the second bus may be second bus 156 (such as a Low Pin Count (LPC) or Enhanced Serial Peripheral Interface (eSPI) bus). Step 404 determines whether a driver for the touchscreen is loaded. If not, the information handling system continues to operate in the first operation mode. If yes, the information handling system proceeds to step 408 to switch to a second operation mode to receive enhanced user input from the touchscreen by transmitting user input received over the first bus to the processor over a third bus. In some embodiments, the third bus may be third bus 154 (such as a communications path between a Platform Controller Hub (PCH) and a processor, the communications path may appear as a PCI device) of FIG. 2. The first and second operation modes may be those described above.

Figure 5:
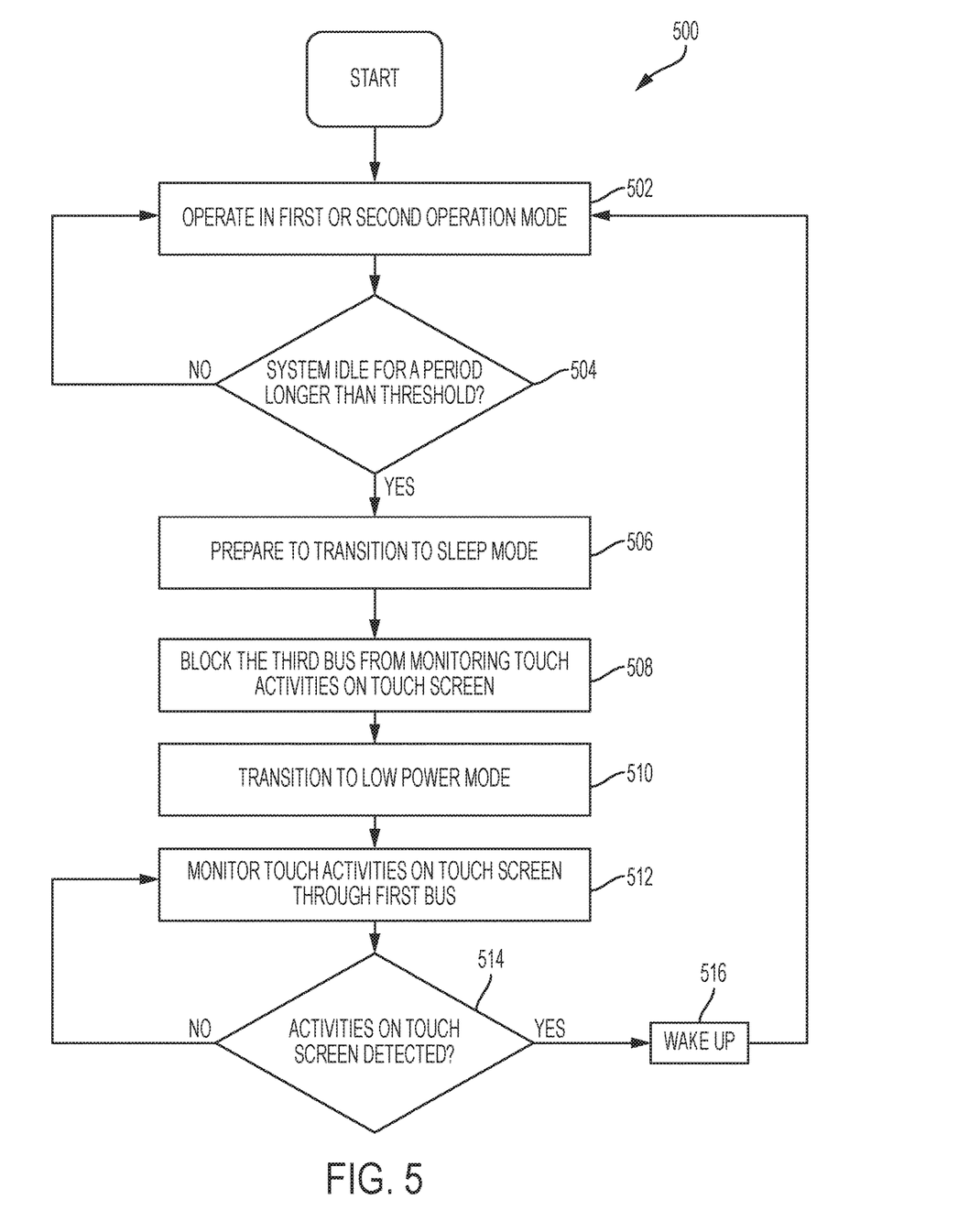
FIG. 5 illustrates one example of a method for processing inputs from a touch input device of an information handling system according to some embodiments of the disclosure.

FIG. 5 illustrates one example method 500 for processing touch input information from a touchscreen of information handling system 100 according to some embodiments of the present disclosure. Beginning at step 502, the information handling system operates in either a first or second operation mode. Step 504 determines whether the information handling system has been idle for longer than a predetermined threshold period. If no, the information handling system continues to operate in its current mode at step 502. If yes, at step 506 the information handling system prepares to transition into a sleep mode. In the sleep mode, the information handling system performs no activities except monitoring for wake-up signals. At step 508, the information handling system blocks the third bus from communicating touch input to the processor. The blocking of the third bus may be performed by an embedded controller holding data and/or clock lines to a low state, such as by controller pull-down transistors coupled to the first bus lines or disabling a branch of a system clock tree coupled to the third bus. In some embodiments, the I/O interface such as the PCH may be put into sleep mode to reduce power consumption. At step 510, the embedded controller of the information handling system may transition to a low power mode and at step 512 monitors touch activities on the touchscreen through the first bus. Step 514 determines whether touch activities have been detected on the touchscreen to wake up the information handling system. If yes, the information handling system wakes up at step 516 to operate in the first or second operation mode at step 502. If the I/O interface was put in sleep mode at step 508, the I/O interface may be activated by the embedded controller. If no at step 514, the information handling system stays in the sleep mode and monitors for activities at step 512. In some embodiments, step 514 may involve filtering the touch screen activities to allow only certain activity to wake-up the information handling system. For example, the touch activities may be filtered such that only a touch involving multiple fingers wakes up the system, or a touch of longer than a certain duration wakes up the system, or the like.

Figure 6:
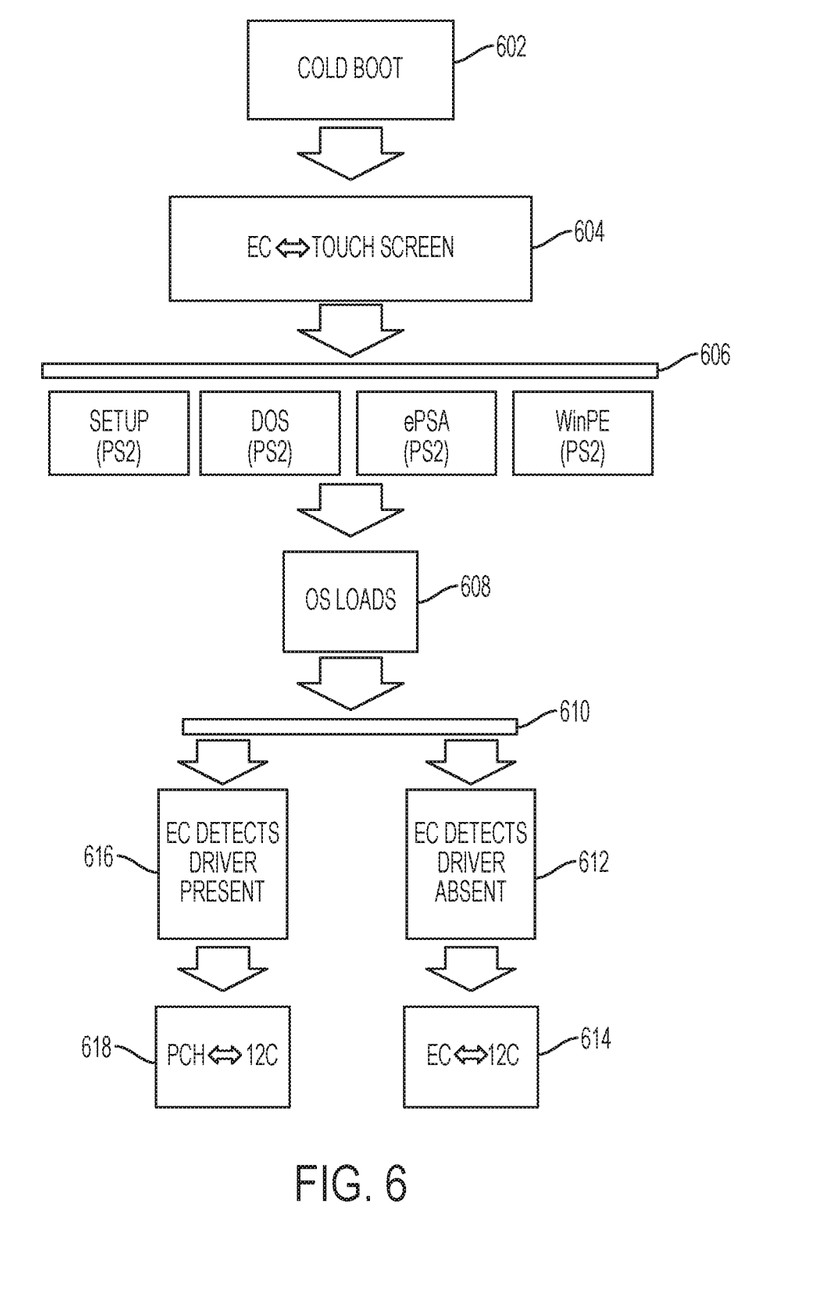
FIG. 6 illustrates one example of an operational flow chart of an information handling system for processing inputs from a touch input device according to some embodiments of the disclosure.

FIG. 6 is a block diagram illustrating one example of an operational flow 600 for processing touch input from a touchscreen of information handling system 100 according to some embodiments of the present disclosure. At step 602, information handling system starts with a cold boot. Because an operating system has not been loaded at this stage, at step 604 the embedded controller of the information handling system receives touch input from the touchscreen via an I2C bus and presents the touch input to a host processor by emulating the touchscreen as a legacy PS2 device. At step 606, the information handling system performs one or more pre-OS operations, such as setting up the system, performing DOS operations, performing an enhanced Pre-boot System Assessment (ePSA), or the like. Because the operating system has not loaded yet to be able to load a driver, the embedded controller continues to emulate the touchscreen as a legacy PS2 device. Then, the operating system loads at step 608 and the embedded controller determines at step 610 whether a driver for the touchscreen is running in the operating system. If the embedded controller detects that the driver for the touchscreen is available at step 616 then, at step 618, the legacy PS2 device emulation is terminated. The touch input is passed via the I2C bus from the touchscreen to the PCH, which presents the touch input to the operating system operating on processor 116 via a communications path between the PCH and processor 116. If the embedded controller detects that the driver for the touchscreen is absent at step 612 then, at step 614, the embedded controller continues to receive touch input via the I2C bus from the touchscreen and emulates the touchscreen as a legacy PS2 device and outputs the emulated input on an I2C bus to the processor.

The schematic flow charts of FIGS. 3-6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. An information handling system, comprising:
   a touchscreen configured to display information and to receive input from a user by touching a location on the touchscreen;
   a controller coupled to the touchscreen and configured, in a first operational mode of the information handling system not having a loaded driver for the touchscreen, to receive a user input from the touchscreen through a first data bus, and to provide the user input to a host processor by presenting, over a second bus, the received user input to the host processor emulated as input from a legacy device; and
   an input/output (I/O) interface coupled to the touchscreen and configured, in a second operational mode of the information handling system having a loaded driver for the touchscreen, to receive a user input from the touchscreen through the first data bus and configured to provide the user input to the host processor over a third bus.

2. The information handling system of claim 1, wherein the controller is further configured detect a gesture of the user in the user input received from the touchscreen, and wherein the controller is further configured to provide a translation of the gesture to the host processor as a legacy input over the second bus.

3. The information handling system of claim 1, wherein the controller is further configured to display a keyboard on the touchscreen to obtain the user input, and wherein the controller is further configured to provide the user input to the host processor over the second bus as an emulated physical keyboard.

4. The information handling system of claim 1, wherein the information handling system is configured to transition into a sleep mode after an idle period, and wherein the controller is further configured to monitor touch activities on the touchscreen and wake up the information handling system in response to detected touch activities.

5. The information handling system of claim 4, wherein the controller is further configured to transition into a power saving mode when the information handling system transitions into the sleep mode.

6. The information handling system of claim 4, wherein the controller is configured to monitor, in the power saving mode, touch activities on the touchscreen.

7. The information handling system of claim 4, wherein the controller is further configured to block the I/O interface from monitoring touch activities on the touchscreen when the information handling system is in the sleep mode.

8. The information handling system of claim 7, wherein the embedded controller is configured to hold a voltage on a clock line and/or a data line low to block the I/O interface from monitoring touch activities on the touchscreen when the information handling system is in the sleep mode.

9. The information handling system of claim 1, wherein the I/O interface comprises a Platform Controller Hub (PCH).

10. The information handling system of claim 1, wherein the controller is configured to perform steps comprising:
    operating the information handling system in the first operational mode at initialization of the information handling system;
    detecting, after the initialization of the information handling system, that the host processor loaded a driver for the touchscreen; and
    switching, after detecting the host processor loaded the driver for the touchscreen, the information handling system to the second operational mode.

11. The information handling system of claim 1, wherein the first bus is an Inter-Integrated Circuit (I2C) bus, wherein the second bus is an Low Pin Count (LPC) bus, wherein the third bus is a communications path between a Platform Controller Hub (PCH) and the host processor, and wherein the embedded controller is configured to perform the step of presenting, over the second bus, the received input to the host processor as input from the legacy device by transmitting PS2 signals over the LPC bus to emulate user input received at the legacy device.

12. A method for processing input from a touchscreen of an information handling system, the method comprising:
    detecting a user touch input at the touchscreen;
    operating in a first operational mode not having a loaded driver for the touchscreen at initialization of the information handling system, wherein in the first operational mode a controller of the information handling system is configured to provide the user touch input to a host processor by presenting the received user touch input to the host processor as input from a legacy device;

detecting, by the controller after the initialization of the information handling system, that the host processor loaded a driver for the touchscreen; and switching, after detecting the host processor loaded the driver for the touchscreen, to a second operational mode having a loaded driver for the touchscreen, wherein in the second operational mode the user touch input is presented to the host processor by an input/output (I/O) interface for processing by the driver for the touchscreen.

13. The method of claim 12, further comprising detecting, by the controller, a gesture of the user in the user input received from the touchscreen, and providing, by the controller, a translation of the gesture to the host processor as a legacy input over the second bus.

14. The method of claim 12, further comprising transitioning the information handling system into a sleep mode after an idle period, and monitoring, by the controller, touch activities on the touchscreen and waking up the information handling system after detecting a wake up signal in the monitored touch activities.

15. The method of claim 14, transitioning the controller into a power saving mode after the information handling system transitions into the sleep mode.

16. The method of claim 14, wherein the controller is configured to monitor touch activities on the touchscreen using the legacy device.

17. A method for processing input from a touchscreen of an information handling system, the method comprising:

detecting a user touch input at the touchscreen;

determining an operational mode of the information handling system;

passing the user input to a host processor of the information handling system via a controller in response to a determination that the information handling system is operating in a first operational mode not having a loaded driver for the touchscreen, wherein the controller is configured to provide the user input to the host processor by presenting the received user input to the host processor as an input from a legacy device; and passing the user input to the host processor via an I/O interface in response to a determination that the information handling system is operating in a second operational mode having a loaded driver for the touchscreen.

18. The method of claim 17, further comprising:

operating the information handling system in the first operational mode at initialization;

detecting, after the initialization of the information handling system, that the host processor loaded a driver for the touchscreen; and switching, after detecting the host processor loaded the driver for the touchscreen, to the second operational mode.

19. The method of claim 17, further comprising detecting, by the controller, a gesture of the user in the user input received from the touchscreen, and providing, by the controller, a translation of the gesture to the host processor emulated as a legacy input over the second bus.

20. The method of claim 17, further comprising transitioning the information handling system into a sleep mode after an idle period, and monitoring, by the controller, touch activities on the touchscreen and waking up the information handling system after a wake up signal is detected in the monitored touch activities.

* * * * *